July 30, 1968 — G. KAZLAUSKAS — 3,395,263
EXTERNAL WELD HEAD
Filed Sept. 30, 1964
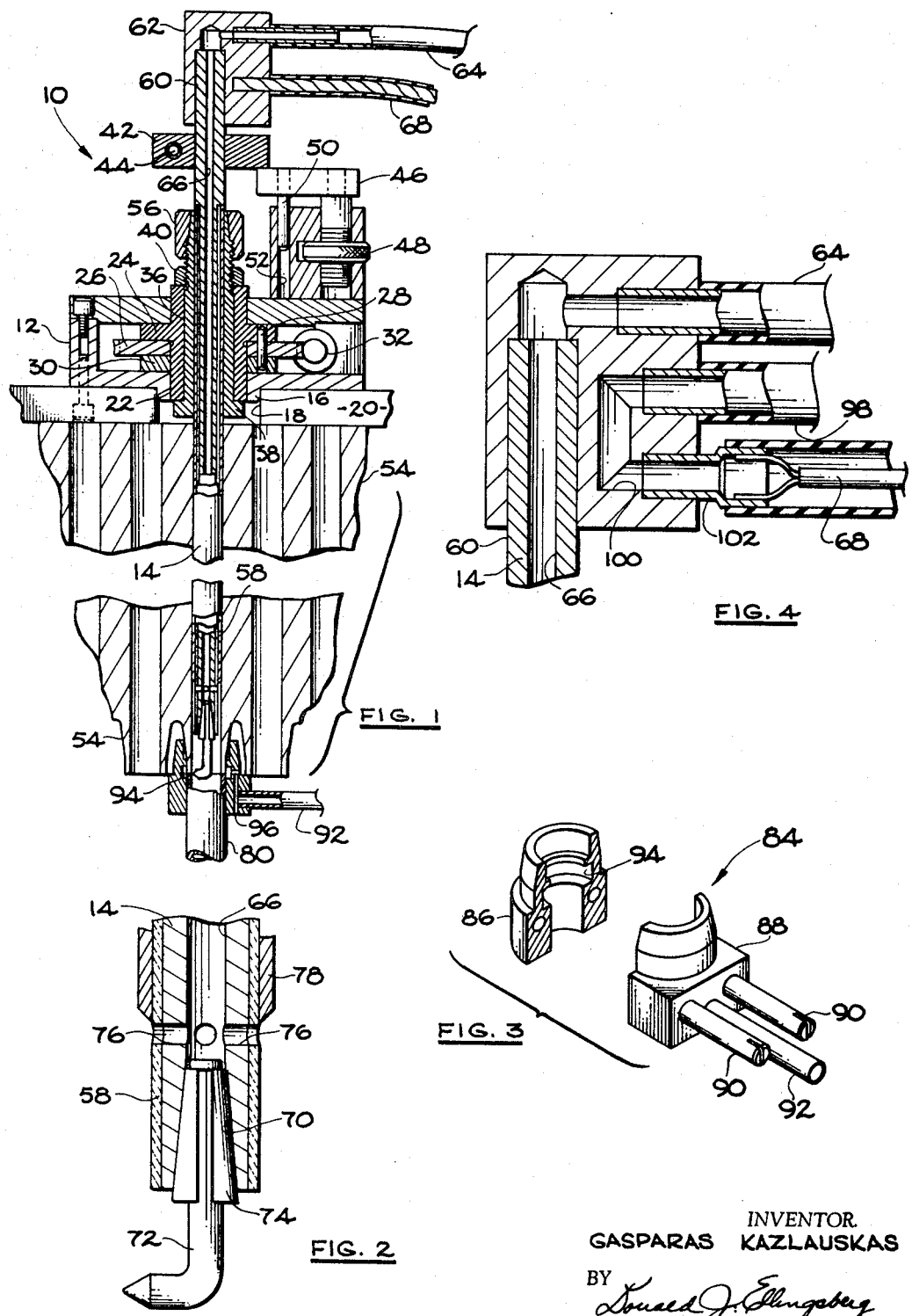
INVENTOR.
GASPARAS KAZLAUSKAS
BY Donald J. Ellingsberg
AGENT

United States Patent Office 3,395,263
Patented July 30, 1968

3,395,263
INTERNAL WELD HEAD
Gasparas Kazlauskas, Encino, Calif., assignor to North American Rockwell Corporation, a corporation of Delaware
Filed Sept. 30, 1964, Ser. No. 400,529
3 Claims. (Cl. 219—125)

ABSTRACT OF THE DISCLOSURE

An internal weld head for arc welding having an adjustable and rotatably driven electrode holder to accurately position a removable welding electrode carried by the electrode holder. The electrode holder has an electrical insulating sleeve member encasing the end portion of the holder. A guide ring is pressed on the outside of the insulating sleeve for stabilizing the holder during rotation about its longitudinal axis and assisting in maintaining a controlled atmosphere at the weld region. The electrode holder is adjustably supported by a housing means which includes an adjustment means for predetermined axial displacement of the electrode holder relatable to the housing means. A drive means cooperates with the housing means and is in driving connection with the electrode holder. An electrically conductive manifold means is separately connected to a non-insulated end of the electrode holder for providing welding current to the holder and electrode, and a controlled atmosphere to the weld zone.

Background of the invention

Internal weld heads have been developed to form welds in small diameter tubing using an internal or inside-out welding technique. When the weld is made from the inside out, the weld is formed by inserting the welding electrode into the tubing. Although these internal weld heads satisfy certain internal welding requirements, there are disadvantages in each when the inside-out weld must be made at a position which is deep within a small diameter tube. For example, accurate positioning of the welding electrode, and accurate control of the arc length are especially critical in deep position welding.

Accurate positioning of the welding electrode is accomplished by various mechanical arrangements in the known internal weld heads. However, the positioning and repositioning of the electrode in each of these weld heads is a complex and time consuming process. Many weld heads are so designed that the electrode itself must be physically removed and repositioned for each weld cycle. When hundreds of welds must be made, the lost time in accurately positioning the electrode is excessive.

Accurate control of the arc length is also needed to form high quality welds. An extended electrode length not only increases the possibility of electrode distortion during a weld cycle but also increases the welding current drop across the electrode. When a low amperage welding current is needed, resistance heating in the long electrode makes accurate control of the arc length difficult and frequently causes the arc to be intermittently extinguished.

Objects of the invention

Accordingly, it is an object of the invention to provide a new and improved internal weld head which enables accurate and positive positioning of the welding electrode.

Another object of the invention is to provide an internal weld head which enables the precise control of an arc length during a weld cycle.

An additional object of the invention is to provide an improved internal weld head which facilitates the removal and replacement of a welding electrode.

Summary of the invention

Briefly, in accordance with the present invention, an internal weld head is provided having a coarse and fine adjustment means to accurately position a welding electrode which is clamped by a collet means in an electrode holder. The electrode holder and electrode are rotated as a unit by a drive means. A manifold means cooperating with the rotating electrode holder feeds a welding current and controlled atmosphere, when necessary for a weld cycle, to the electrode holder. The electrode holder conducts the welding current to the electrode, and a suitable bore means in the electrode holder passes the controlled atmosphere to the weld region.

Further objects, features and the attending advantages of the present invention will become apparent when the following description is read in conjunction with the drawing.

Brief description of the drawing

FIGURE 1 is a sectional view of the internal weld head of the present invention in an operating position;
FIGURE 2 is an enlarged sectional view of the collet electrode holder of the internal weld head of FIGURE 1;
FIGURE 3 is an exploded perspective view of the outer manifold for the internal weld head of FIGURE 1; and
FIGURE 4 is a sectional view of one modification of the upper manifold for the internal weld head of FIGURE 1.

Description of the invention

Referring to the drawing described briefly above and particularly to FIGURE 1, a preferred embodiment of the new and improved internal weld head 10 of the invention has an assembled drive housing 12 which rotatably positions an electrically conductive electrode holder 14. The drive housing 12 has a pilot 16 suitably formed and adapted for insertion into a pilot opening 18 in a weld head support member 20. While the drive housing pilot and support member cooperate to accurately position the internal weld head for certain operating locations, one as hereinafter described, it is also contemplated that the separate support member may be omitted.

A collar bushing 22 is rotatably positioned by the drive housing 12. The collar bushing 22 has a radially extending shoulder portion 24 which is attached to a worm gear 26 by a lockpin 28. Worm gear 26 is positioned between the shoulder portion 24 and a separate bearing plate 30 which is also connected to the worm gear 26 by the lockpin 28.

Worm gear 26 is rotated by a worm 32 which can be driven by a suitable drive motor and interconnecting flexible cable (not shown). It is contemplated that a direct drive motor, such as a DC drive motor, can be positioned in the drive housing which would eliminate the need for a flexible drive cable, and inter alia, improve the portability of the internal weld head.

A coarse and fine adjustment means is provided in the embodiment of FIGURE 1 as hereinafter described. An insulating collet sleeve 36 with a radially extending flange portion 38 is inserted into the hollow collar bushing 22 until the flange bears upon the collar bushing. A lock nut 40 threadably engages the collet sleeve 36 and clamps the sleeve to the bushing 22 so that both the sleeve and the collar bushing rotate with worm gear 26. The electrode holder or rod 14 extends through the insulating collet sleeve 36 and is supported therein by a split step collar 42 which is clamped to the electrode holder by screw 44. The step collar 42 positions the electrode holder 14 in a longitudinal adjustment with regard to the drive housing 12.

The step collar 42 bears upon a height gauge plate 46 whose longitudinal position is adjusted by turning a micrometer wheel 48. Height gauge plate 46 is prevented from rotating, when the micrometer wheel 48 is turned, by a suitable guide pin 50 that slides within bore 52. Adjustment of the height gauge plate 46 by turning micrometer wheel 48 provides a fine longitudinal adjustment of the electrode holder 14. When longitudinally positioned, electrode holder 14 is secured within the insulating collet sleeve 36 by a collet clamp nut 56 which threadably engages the collet sleeve and exerts an inwardly directed radial force upon the electrode holder.

The coarse and fine longitudinal adjustments provide accurate positioning of the electrode holder within a tubular member, e.g., one of similar openings in tube sheet 54 of a conventional heat exchanger as shown by FIGURE 1.

An electrically insulating sleeve member 58 on the electrode holder 14 insulates the electrode holder from the tubular member such as tube sheet 54. One end 60 of the electrode holder 14 is not encased by the member 58. It is contemplated that the electrode holder can have a suitable electrically insulated coating rather than the separate sleeve member to insulate the holder from the tubular member.

One form of a manifold means such as upper gas-and-current manifold 62 is particularly shown by FIGURE 1. The upper manifold 62 is positioned on the polished, non-insulated end 60 of the electrode holder 14 as a slip fit. The upper manifold remains substantially stationary as the electrode holder is rotated by the worm gear 26 and related drive arrangement. An inlet hose 64 directs a controlled atmosphere such as an inert gas, e.g., helium or argon, from an external source (not shown) through the upper manifold to a bore means such as axially extending bore 66 in the electrode holder 14. An insulated electrical cable 68 feeds an electrical welding current from a conventional power supply (not shown) to the electrode holder 14 through the electrically conductive upper manifold 62. It is contemplated that not only the rotation of the electrode holder but also the flow of an inert gas and welding current can be controlled by a selected one of several known automatic weld programmers which are equipped with either electronic or mechanically initiated controls so that the complete welding cycle can be performed automatically.

Referring now to FIGURE 2, bore 66 in electrode holder 14 terminates as a cone frustrum taper 70. An electrode 72, which is preferably thiorated tungsten, is inserted into a collet means such as split taper collet 74. The collet 74 with electrode 72 is positioned as a press fit into the cone frustrum taper 70 in the electrode holder 14. The taper collet 74 is easily removed from the electrode holder for replacement of the electrode 72.

The inert gas which passes through the bore 66 egresses therefrom through similar radially extending holes 76 which are circumferentially spaced around the electrode holder at a point generally adjacent to the beginning of the frustrum taper 70. The similar holes 76 provide an outlet for the inert gas and preferably have a total area in excess of the area of bore 66 to allow for an even distribution of gas flow at the weld region. The welding current passes along a current path formed by the electrically conducting electrode holder 14, the taper collet 74, and the electrode 72.

A guide ring 78, which is preferably formed from stainless steel and pressed on the outside of the insulating sleeve member 58, is positioned generally adjacent the egress holes 76 in the electrode holder 14. The outside diameter of the guide ring 78 is a slip fit within the internal diameter of the tubular member into which the electrode holder is positioned. The guide ring 78 stabilizes the electrode holder 14 during rotation about its longitudinal axis and assists in maintaining the controlled atmosphere at the weld region. The guide ring 78 further ensures that precise control of a developed arc length is maintained when a weld cycle is performed, particularly at a deep location in small diameter tubing.

Operatively, the electrode holder 14 of the internal weld head 10 of the present invention is positioned longitudinally within a tubular member such as an opening in tube sheet 54, and the tip of the electrode 72 is positioned at the desired weld joint, e.g., where small diameter tube 80 butts against the tube sheet 54, as shown by FIGURE 1. Adjusting the position of the step collar 42 provides the coarse adjustment of the electrode tip and adjusting the position of the height gauge plate 46 provides a fine adjustment of the electrode tip. When the electrode is accurately positioned at the weld joint, the collet clamp nut 56 is tightened to secure the electrode holder 14 for subsequent rotation by the worm gear 26 and the related drive means. The welding current and controlled atmosphere are introduced to the weld head as the electrode traverses the weld joint to form the desired weld, preferably without the use of additional filler material. When a conventional automatic weld programmer is used with the new and improved internal weld head of the present invention, the initiation of the weld cycle is accomplished by actuating the programmer and automatic control is thereafter maintained in a conventional manner.

In certain welding operations, it has been found particularly desirable to provide an external or outer gas manifold 84 as more clearly shown by FIGURE 3. The gas manifold 84 not only supplies a controlled atmosphere to the external surfaces of the members being joined at the weld region but also acts as an alignment clamp for the members. The external manifold is formed from two half sections 86 and 88 which are joined by similar thumb screws 90 in a preferred embodiment. An inert gas passes through pipe 92 from the external gas source (not shown) to an inner manifold channel 94 which is formed by the assembled sections 86 and 88. A suitable bore 96 (see FIGURE 1) connects the manifold channel 94 with the pipe 92 and further provides an exhaust port to ambient. The external manifold 84 is readily removable and usable for repeated weld operations.

Referring now to FIGURE 4, a modification of the upper manifold for the internal weld head is shown. Like numerals are used for like parts as previously described and shown. It is desirable in certain welding operations, particularly where continuous welding or near continuous welding is contemplated, to provide a cooling fluid to the upper manifold. The manifold can be suitably ducted so that a fluid, such as water, can be introduced through an inlet hose 98 and channeled through an internal cavity 100.

The cooling fluid then flows through outlet 102 which is common with the electrical cable 68. The introduction of the cooling fluid to the upper manifold provides the necessary cooling to counteract the effects of resistance heating between the slipfit manifold and the non-insulated end 60 of the electrode holder.

As will be evidenced from the foregoing description, certain aspects of the present invention are not limited to the particular details of construction as illustrated and described. It is contemplated that other modifications and applications will occur to those skilled in the art, and it is therefore intended that the appended claims shall cover such modifications and applications that do not depart from the true spirit and scope of the invention.

Having described my invention, what I desire to claim and secure by Letters Patent of the United States is:

1. An improved internal weld head comprising:
 (a) a housing means,
 (b) an electrically conductive electrode holder having first and second ends and being adjustably supported by said housing means between said first and second ends,
 (c) electrical insulator means substantially encasing said electrode holder, (d) said first end of said electrode holder being non-insulated by said electrical insulator means,
(e) guide means cooperating with said second end of said electrode holder, said guide means positioned external to said electrical insulator means,
(f) an axially extending bore in said electrode holder,
(g) adjustment means cooperating with said housing means and said electrode holder for predetermined axial displacement of said electrode holder relative to said housing means,
(h) drive means cooperating with said housing means and further having a driving connection with said electrode holder,
(i) separable collet means cooperating with said second end of said electrode holder,
(j) an electrode separably secured by said collet means to said electrode holder,
(k) at least one aperture adjacent said electrode and extending through said electrode holder to said axially extending bore,
(l) said aperture having a total cross-sectional area greater than the total cross-sectional area of said bore, and
(m) an electrically conductive manifold means separably connected to said first non-insulated end of said electrical holder and providing a welding current to said electrode holder and said electrode, and further providing a controlled atmosphere to said axially extending bore.

2. The improved weld head of claim 1 in which said axially extending bore at said second end is substantially enlarged to receive said collet means therein.

3. The improved weld head of claim 2 in which said enlarged portion is an inner cone frustrum taper.

References Cited

UNITED STATES PATENTS

| | | |
|---|---|---|
| 2,868,953 | 1/1959 | Gardner. |
| 3,071,679 | 1/1963 | Fetz _____ 219—120 |
| 3,084,243 | 4/1963 | Gotch. |
| 3,142,745 | 7/1964 | Gotch _____ 219—125 |
| 3,290,032 | 12/1966 | Brouwer _____ 219—125 |

RICHARD M. WOOD, *Primary Examiner.*

W. D. BROOKS, *Assistant Examiner.*